United States Patent
Weisman et al.

(10) Patent No.: US 7,682,523 B2
(45) Date of Patent: Mar. 23, 2010

(54) FLUORESCENT SECURITY INK USING CARBON NANOTUBES

(75) Inventors: R. Bruce Weisman, Houston, TX (US); Sergei M. Bachilo, Houston, TX (US); Eric Christopher Booth, Moorhead, MN (US)

(73) Assignee: William Marsh Rice University, Houston, TX (US)

( * ) Notice: Subject to any disclaimer, the term of this patent is extended or adjusted under 35 U.S.C. 154(b) by 306 days.

(21) Appl. No.: 10/572,720

(22) PCT Filed: Sep. 2, 2004

(86) PCT No.: PCT/US2004/028603
§ 371 (c)(1), (2), (4) Date: Aug. 1, 2006

(87) PCT Pub. No.: WO2005/028577
PCT Pub. Date: Mar. 31, 2005

(65) Prior Publication Data
US 2007/0062411 A1    Mar. 22, 2007

Related U.S. Application Data (60) Provisional application No. 60/500,394, filed on Sep. 5, 2003.

(51) Int. Cl.
C09D 11/00 (2006.01)
C09K 11/65 (2006.01)
(52) U.S. Cl. .............. 252/301.36; 106/31.64
(58) Field of Classification Search ........... 252/301.36; 106/31.64
See application file for complete search history.

(56) References Cited

U.S. PATENT DOCUMENTS

| | | | |
|---|---|---|---|
| 4,558,224 A | 12/1985 | Gober | |
| 5,374,415 A | 12/1994 | Alig et al. | |
| 6,246,061 B1 | 6/2001 | Ramsey et al. | |
| 6,330,939 B1* | 12/2001 | Pratt | 194/206 |
| 7,097,788 B2* | 8/2006 | Kirkor et al. | 252/502 |
| 7,501,108 B2* | 3/2009 | Yerushalmi-Rozen et al. | 423/447.1 |
| 2002/0025490 A1* | 2/2002 | Shchegolikhin et al. | 430/270.15 |

FOREIGN PATENT DOCUMENTS

| | | | |
|---|---|---|---|
| EP | 1 020 888 B1 | | 8/2005 |
| JP | 2003-026981 | * | 1/2003 |
| WO | WO 2005/012172 | | 2/2005 |

OTHER PUBLICATIONS

Abstract for JP 2003-26981, Jan. 29, 2003.*
O'Connell et al, "Band Gap Fluorescence from Individual Single-Walled carbon Nanotubes", Science, vol. 297, Jul. 26, 2002, pp. 593-596.*

(Continued)

*Primary Examiner*—C. Melissa Koslow
(74) *Attorney, Agent, or Firm*—Winstead PC (57) ABSTRACT

The present invention is directed toward fluorescent inks and markers comprising carbon nanotubes. The present invention is also directed toward methods of making such inks and markers and to methods of using such inks and markers, especially for security applications (e.g., anti-counterfeiting). Such inks and markers rely on the unique fluorescent properties of semiconducting carbon nanotubes.

14 Claims, 5 Drawing Sheets

OTHER PUBLICATIONS

Strano et al., "Assignment of (n, m) Raman and Optical Features of Metallic Single-Walled Carbon Nanotubes", Nano Letters (2003) 3, pp. 1091-1096.
Haddon et al., "Purification and Separations of Carbon Nanotubes", Materials Research Society Bulletin (2004) 29, pp. 252-259, Apr.
Weisman, "Simplifying Carbon Nanotube Identification", American Institute of Physics (2004) pp. 24-27, Feb./Mar.
Weisman et al., "Fluorescence Spectroscopy of Single-Walled Carbon Nanotubes in Aqueous Suspension", Appl. Phy. A (2004) 78, pp. 1111-1116, Mar.
Iijima, "Helical microtubules of graphitic carbon", Nature 354, 56-58 (Nov. 7, 1991); doi:10.1038/354056a0.
Iijima et al., "Single-shell carbon nanotubes of 1-nm diameter", Nature 363, 603-605 (Jun. 17, 1993); doi:10.1038/363603a0.
Bethune et al., "Cobalt-catalysed growth of carbon nanotubes with single-atomic-layer walls", Nature 363, 605-607 (Jun. 17, 1993); doi:10.1038/363605a0.
Baughman et al., "Carbon Nanotubes—the Route Toward Applications", Science Aug. 2, 2002 297: 787-792 [DOI: 10.1126/science.1060928].
O'Connell et al., "Band Gap Fluorescence from Individual Single-Walled Carbon Nanotubes", Science Jul. 26, 2002 297: 593-596 [DOI: 10.1126/science.1072631].
Dresselhaus, et al., Science of Fullerenes and Carbon Nanotubes: Their Properties and Applications, 965 pages, Academic Press (Feb. 20, 1996).
Bronikowski et al., "Gas-phase production of carbon single-walled nanotubes from carbon monoxide via the HiPco process: A parametric study", Journal of Vacuum Science & Technology A: Vacuum, Surfaces, and Films, vol. 19, Issue 4, pp. 1800-1805, Jul. 2001.
R. Saito, et al., Physical Properties of Carbon Nanotubes, World Scientific Publishing Company; 1st edition (Sep. 15, 1998) 259 pages.
Avouris, "Molecular Electronics with Carbon Nanotubes", Acc. Chem. Res., Jul. 31, 2002, 35 (12), pp. 1026-1034.
Strano et al., "The Role of Surfactant Adsorption during Ultrasonication in the Dispersion of Single-Walled Carbon Nanotubes", Journal of Nanoscience and Nanotechnology, vol. 3, Nos. 1-2, Feb. 2003, pp. 81-86(6).
Bachilo et al., "Structure-Assigned Optical Spectra of Single-Walled Carbon Nanotubes", Science Dec. 20, 2002 298: 2361-2366; published online Nov. 29, 2002 [DOI: 10.1126/science.1078727] (in Reports).
Thess et al., "Crystalline Ropes of Metallic Carbon Nanotubes", Science Jul. 26, 1996 273: 483-487 [DOI: 10.1126/science.273.5274.483] (in Reports).
Chen et al., "Solution Properties of Single-Walled Carbon Nanotubes", Science Oct. 2, 1998 282: 95-98 [DOI: 10.1126/science.282.5386.95] (in Reports).
Holzinger et al., "Sidewall Functionalization of Carbon Nanotubes", Angewandte Chemie International Edition, vol. 40, Issue 21, Date: Nov. 5, 2001, pp. 4002-4005.
Khabashesku et al., "Fluorination of Single-Wall Carbon Nanotubes and Subsequent Derivatization Reactions", pp. 1087-1095, Publication Date (Web): Dec. 2, 2002.
Strano et al., "Electronic Structure Control of Single-Walled Carbon Nanotube Functionalization", Science Sep. 12, 2003 301: 1519-1522 [DOI: 10.1126/science.1087691].
S. Niyogi et al., "Chemistry of Single-Walled Carbon Nanotubes", pp. 1105-1113 Publication Date (Web): Oct. 15, 2002.
Krupke et al., "Separation of Metallic from Semiconducting Single-Walled Carbon Nanotubes", Science Jul. 18, 2003 301: 344-347; published online Jun. 26, 2003.
Chattophadhyay et al., "A Route for Bulk Separation of Semiconducting from Metallic Single-Wall Carbon Nanotubes", pp. 3370-3375, Publication Date (Web): Feb. 22, 2003.
Zheng et al., "DNA-assisted dispersion and separation of carbon nanotubes", Nature Matter, May 2003, vol. 2 No. 5 pp. 285-348.
Chen et al., "Bulk Separative Enrichment in Metallic or Semiconducting Single-Walled Carbon Nanotubes", pp. 1245-1249, Publication Date (Web): Aug. 20, 2003.
Ebbesen, et al., "Carbon Nanotubes," Annual Review of Materials Science, vol. 24.
Vander Wal et al., "Flame synthesis of Fe catalyzed single-walled carbon nanotubes and Ni catalyzed nanofibers: growth mechanisms and consequences", Chemical Physics Letters, vol. 349, Issues 3-4, Nov. 30, 2001, pp. 178-184.
Hafner et al., Catalytic growth of single-wall carbon nanotubes from metal particles Chemical Physics Letters, vol. 296, Issues 1-2, Oct. 30, 1998, pp. 195-202.
Cheng et al., "Bulk morphology and diameter distribution of single-walled carbon nanotubes synthesized by catalytic decomposition of hydrocarbons", Chemical Physics Letters, vol. 289, Issues 5-6, Jun. 19, 1998, pp. 602-610.
Nikolaev et al., "Gas-phase catalytic growth of single-walled carbon nanotubes from carbon monoxide", Chemical Physics Letters, vol. 313, Issues 1-2, Nov. 5, 1999, pp. 91-97.
Chiang et al., "Purification and Characterization of Single-Wall Carbon Nanotubes", J. Phys. Chem. B, 2001, 105 (6), pp. 1157-1161, Publication Date (Web): Jan. 12, 2001.
Chiang et al., "Purification and Characterization of Single-Wall Carbon Nanotubes (SWNTs) Obtained from the Gas-Phase Decomposition of CO (HiPco Process)", J. Phys. Chem. B, 2001, 105 (35), pp. 8297-8301, Publication Date (Web): Aug. 10, 2001.
Liu et al., "Fullerene Pipes", Science May 22, 1998 280: 1253-1256 [DOI: 10.1126/science.280.5367.1253] (in Reports).
Gu et al., "Cutting Single-Wall Carbon Nanotubes through Fluorination", Nano Letters, 2002, 2 (9), pp. 1009-1013, Publication Date (Web): Aug. 7, 2002.
Ramesh et al., "Dissolution of Pristine Single Walled Carbon Nanotubes in Superacids by Direct Protonation", J. Phys. Chem. B, 2004, 108 (26), pp. 8794-8798, Publication Date (Web): May 26, 2004.
Bahr et al., "Covalent chemistry of single-wall carbon nanotubes", J. Mater. Chem., 2002, 12, 1952-1958, DOI: 10.1039/b201013p.
Weisman et al., "Dependence of Optical Transition Energies on Structure for Single-Walled Carbon nanotubes in Aqueous Suspension: An Empirical Kataura Plot", Nano Lett, vol. 3, No. 9, pp. 1235-1238, 2003.

* cited by examiner

FLUORESCENT SECURITY INK USING CARBON NANOTUBES

CROSS REFERENCE TO RELATED APPLICATIONS

This Application claims priority to U.S. Provisional Patent Application Ser. No. 60/500,394, filed Sep. 5, 2003.

The present invention was made with support from the Robert A. Welch Foundation, Grant No. C-0807; and the National Science Foundation, Grant No. CHE-9900417.

FIELD OF THE INVENTION

The present invention relates generally to fluorescent inks and markers, especially for security applications. More specifically, the invention relates to such inks and markers comprising carbon nanotubes.

BACKGROUND OF THE INVENTION

The issues of authentication and counterfeit deterrence can be important in many contexts. Bills of currency, stock and bond certificates, credit cards, passports, drivers licenses, as well as many other legal documents (e.g., deeds, wills, etc.) all must be reliably authentic to be useful. Museums and art galleries face such challenges when authenticating works of art. Additionally, consumer products and other articles of manufacturing, such as pharmaceuticals, books, movies, software, etc., are frequently the subject of counterfeiting in the form of "pirated" versions or "knock-offs."

A wide variety of attempts have been made to limit the likelihood of counterfeiting. Most such attempts tend to incorporate a unique identifier into the potentially counterfeited item. The addition of fluorescent compounds to inks and dyes has long been a technique used by governments and banks for anti-counterfeiting purposes. Likewise, fluorescent compounds can be incorporated or otherwise associated with other articles for identification and/or anti-piracy purposes. See, e.g., U.S. Pat. Nos. 4,558,224 and 6,246,061.

Fluorescence, being a subset of photoluminescence (PL), occurs when a material is irradiated with electromagnetic radiation (EM), at least some of which is absorbed. Fluorescence refers to the subsequently re-emitted radiation of wavelength other than that which was absorbed. Typically, such emission, or fluorescence, is red-shifted to longer wavelengths relative to the incident or absorbed radiation, such emission can also be described as being Stokes shifted. The terms "fluorescence," "luminescence," and "photoluminescence," will be used synonymously herein.

Fluorescent compounds typically used in such above-described applications are generally organic molecules that fluoresce in the visible region of the EM spectrum when irradiated with ultra-violet (UV) light. There is, however, a constant need for both new and better fluorescent compounds to a) stay ahead of the would-be counterfeiters, and b) to expand the breadth of such marking and authentication techniques, wherein such fluorescent compounds offer a more unique optical signal and/or yield themselves to processing and operating conditions unsuitable for existing fluorescent compounds.

BRIEF DESCRIPTION OF THE INVENTION

The present invention is directed toward fluorescent inks and markers comprising carbon nanotubes, and to methods of using carbon nanotubes (CNTs) as fluorescent identifiers for anti-counterfeiting and authentication purposes.

Generally, the fluorescent inks of the present invention comprise a dispersion or suspension of CNTs in a liquid (i.e., solvent) medium. Such a dispersion may further comprise surfactant species and/or other traditional ink components. Such inks may be referred to herein as "nanotube inks." Note that such inks are but a subset of the fluorescent markers of the present invention that can be attached to, incorporated into, or otherwise associated with an article for which identification and/or authentication is deemed important, generally at some point in the future.

Methods of using CNTs as fluorescent identifiers generally rely on a knowledge of their photoluminescence properties and on techniques of incorporating and/or attaching such species into and/or to articles being marked or tagged. Note that the terms "marker" and "taggant" (and their verb conjugates) will be used synonymously herein.

Generally, the fluorescence is effected by irradiating the item or article comprising CNTs with visible light (i.e., radiation in the visible region of the EM spectrum). The fluorescence is then detected in the near infrared (NIR) region of the EM spectrum. Depending on the embodiment, such detection can be of a qualitative or quantitative nature. In some embodiments, the detection involves imaging. Such imaging can be spectral or even multi-spectral.

In some embodiments of the present invention, the CNTs are chemically derivatized. Such chemical derivatization expands the range of solvents and solvent systems that can be employed to generate the suspension of single-wall carbon nanotubes as utilized in the present invention. Such chemical derivatization can be removed via thermal and/or chemical treatments subsequent to printing such inks and/or incorporating such markers.

In some embodiments, the CNTs are homogenized by electronic type according to a separation procedure. Generally, this translates to a concentration of one electronic type within a mixture of types (e.g., increasing the amount of semiconducting CNTs with respect to metallic and semi-metallic CNTs). Thus, in some embodiments, the population of CNTs for a particular application may be largely semiconducting CNTs with a small range of bandgaps.

In some embodiments, through such above-described chemical derivatizations and/or separation procedures, "designer" compositions of CNTs can be used in which the photoluminescence properties of the CNT-based inks and markers are tuned within a range of excitation and emission wavelengths. This provides for an almost limitless variety of unique inks and markers with which to incorporate into, and/or associate with, articles for identification, anti-counterfeiting, and authentication purposes. In some embodiments, the fluorescence characteristics of a population of CNTs is varied by modulating the parameters of the CNT synthesis.

In some embodiments, the invention is drawn to a suspension of CNTs, such as a suspension of single-walled carbon nanotubes (SWNTs), wherein the suspension serves as an invisible ink. In some embodiments, this ink is an aqueous suspension. When dried, this nanotube ink is virtually invisible. However, the nanotube ink will fluoresce when illuminated with light of an appropriate wavelength; for instance it will glow in the near-infrared when illuminated with visible light of the appropriate wavelength. If partly or fully structure-separated nanotube samples are used, then one can prepare inks that have distinct wavelengths of excitation and emission.

In some embodiments of the present invention, a dilute aqueous surfactant suspension of CNTs, such as SWNTs, is applied to paper or cloth using flowing ink pens, inkjet printers, etc., wherein such a suspension (dispersion) is the ink. After drying, the "ink" can be illuminated with visible light matching a second, third, or higher van Hove optical transition of the semiconducting carbon nanotubes. This yields a luminescence emission at a corresponding first van Hove wavelength in the near-infrared. Resulting images (in the case of written words, shapes, and/or patterns) can be visualized in the near-infrared using appropriate near-infrared detection equipment (e.g., an InGaAs camera). Spectral filtering can also distinguish different nanotube species in the ink because each will show distinct absorption and emission wavelengths. This latter aspect is highly relevant in embodiments wherein pluralities of nanotubes have been manipulated to be concentrated in a particular type species within the greater collection of CNTs within the ink or marker.

In some embodiments, the compositions (inks and markers) of the present invention are used as anti-counterfeiting markings for high-value items, such as currency. Nanotubes of different diameters can be used to prepare various inks for selectively inscribing different denominations of bills. For example, a $100 bill would exhibit fluorescence only with a specific combination of excitation and observation wavelengths; a $50 bill with a different combination, etc. This spectral selectivity feature can be used with or without imaging detection.

In some embodiments, the compositions and methods of the present invention are used to provide spectral "bar coding" for non-contact identification of items, such as clothing. Combinations of different nanotube inks can be applied to merchandise at the factory and then detected remotely by an infrared scanner for inventory-taking, identification at a sales counter, or theft control. The selective use of several different nanotube species provides many possible combinations of emission wavelengths that can be used to generate spectral bar code identifiers.

In some embodiments, the compositions of the present invention are used in currency as replacements for the magnetic identifiers currently used to identify different denominations (such as by integration of the nanotube inks into the currency), in machines, such as, for example, vending machines. Such an application would rely on optical detection rather than magnetic detection to differentiate the bills. Alternatively, such optical identifiers of the present invention can be used in combination with existing identifiers (e.g., magnetic materials and/or fluorescent dyes). Numerous other applications for such inks/markers exist.

The present invention provides improvement over the existing fluorescent identifiers in that the unique excitation and emission wavelengths of these nanotube inks and markers cannot be simulated by conventional fluorescent materials. Furthermore, the region of the EM spectrum in which these inks and markers fluoresce is generally inaccessible with other fluorophores. Also, there is virtually no background emission in the near-infrared, so only tiny quantities of nanotubes are required for marking. Furthermore, other fluorescent ink materials do not offer the variety of wavelength-specific forms that can provide the added information and security of nanotube ink. Finally, numerous methods of inducing luminescence and known detection systems capable of detecting the emission can be employed.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is directed toward fluorescent inks and markers comprising carbon nanotubes, and to methods of using carbon nanotubes (CNTs) as fluorescent identifiers for anti-counterfeiting and authentication purposes.

Carbon nanotubes (CNTs) comprising multiple concentric shells and termed multi-wall carbon nanotubes (MWNTs) were discovered by Iijima in 1991 [Iijima, *Nature* 1991, 354, 56]. Subsequent to this discovery, single-wall carbon nanotubes (SWNTs), comprising a single graphene rolled up on itself, were synthesized in an arc-discharge process using carbon electrodes doped with transition metals [Iijima, S.; Ichihashi, T. *Nature* 1993, 363, 603; and Bethune et al., *Nature* 1993, 363, 605]. These carbon nanotubes (especially CNTs with diameters less than about 3 nm, e.g., SWNTs) possess unique mechanical, electrical, thermal and optical properties, and such properties make them attractive for a wide variety of applications. See Baughman et al., *Science*, 2002, 297, 787-792.

The diameter and chirality of individual CNTs are described by integers "n" and "m," where (n,m) is a vector along a graphene sheet which is conceptually rolled up to form a tube. When |n−m|=3q, where q is an integer, the CNT is a semi-metal (bandgaps on the order of milli eV). When n−m=0, the CNT is a true metal and referred to as an "armchair" nanotube. All other combinations of n-m are semiconducting CNTs with bandgaps typically in the range of 0.5 to 1.5 eV. See O'Connell et al., *Science*, 2002, 297, 593. CNT "type," as used herein, refers to such electronic types described by the (n,m) vector (i.e., metallic, semi-metallic, and semiconducting). CNT "species," as used herein, refers to CNTs with discrete (n,m) values. It is the semiconducting CNTs that possess fluorescence properties that make them useful as the optical identifiers of the present invention.

All known preparative methods lead to polydisperse materials of semiconducting, semimetallic, and metallic electronic types. See M. S. Dresselhaus, G. Dresselhaus, P. C. Eklund, *Science of Fullerenes and Carbon Nanotubes*, Academic Press, San Diego, 1996; Bronikowski et al., *Journal of Vacuum Science & Technology* 2001, 19, 1800-1805; R. Saito, G. Dresselhaus, M. S. Dresselhaus, *Physical Properties of Carbon Nanotubes*, Imperial College Press, London, 1998. As such, a primary hurdle to the widespread application of CNTs, and SWNTs in particular, is their manipulation according to electronic structure [Avouris, *Acc. Chem. Res.* 2002, 35, 1026-1034].

Recent advances in the solution phase dispersion [Strano et al., *J. Nanosci. and Nanotech.*, 2003, 3, 81; O'Connell et al., *Science*, 2002, 297, 593-596] along with spectroscopic identification using bandgap fluorescence [Bachilo et al., *Science*, 2002, 298, 2361; and commonly-assigned U.S. Pat. No. 7,074,310] and Raman spectroscopy [Strano, *Nanoletters* 2003, 3, 1091] have greatly improved the ability to monitor electrically distinct nanotubes as suspended mixtures and have led to definitive assignments of the optical features of semiconducting [Bachilo et al., *Science*, 2002, 298, 2361], as well as metallic and semi-metallic species [Strano, *Nanoletters*, 2003, 3, 1091]. Indeed, such spectroscopic assignments can provide a background for the optical bar coding of the present invention.

Figure 1:
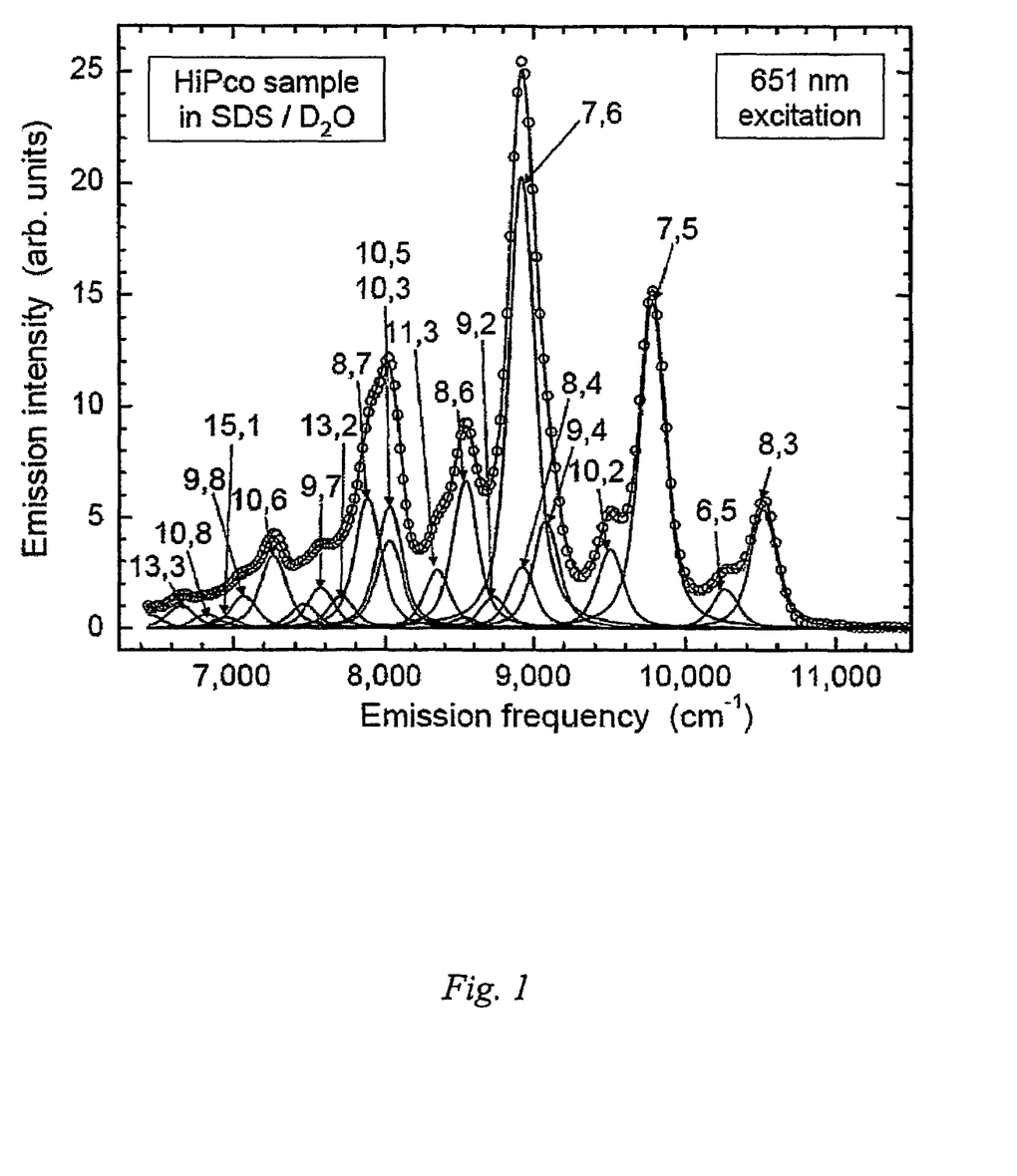
FIG. 1 is a fluorescence spectral analysis of an aqueous ($D_2O$) suspension of SWNTs obtained using a single-wavelength excitation (651 nm), wherein the SWNTs are surfactant-suspended with sodium dodecylsulfate (SDS), and wherein a deconvolution of the peaks illustrates the manner in which the fluorescence is highly unique to a particular collection of CNTs such that each one of the deconvoluted peaks in the figure is the result of a different semiconducting SWNT species being present, the particular species being indicated by the n,m indices above each peak.

Shown in FIG. 1 is a fluorescence spectral analysis of an aqueous ($D_2O$) suspension of SWNTs using a single-wavelength excitation (651 nm), wherein the SWNTs are surfactant-suspended with sodium dodecylsulfate (SDS). Deconvolution of the peaks illustrates the manner in which the fluorescence is highly unique to a particular collection of CNTs. Each one of the deconvoluted peaks in the figure is the result of a different semiconducting SWNT species being present, the particular species being indicated by the n,m indices above each peak Emission intensity for each peak is a function of the relative concentration of the particular species providing for a particular peak.

Techniques of chemically functionalizing CNTs have greatly facilitated the ability to manipulate these materials, particularly for SWNTs which tend to assemble into rope-like aggregates [Thess et al., *Science*, 1996, 273, 483-487]. Such chemical functionalization of CNTs is generally divided into two types: tube end functionalization [Chen et al., *Science*, 1998, 282, 95-98], and sidewall functionalization [PCT publication WO 02/060812 by Tour et al.; Holzinger et al., *Angew. Chem. Int. Ed.*, 2001, 40, 4002-4005; Khabashesku et al., *Acc. Chem. Res.*, 2002, 35, 1087-1095]. Most recently, SWNTs were shown to be selectively functionalizable, providing a chemical route to their separation. See Strano et al., *Science*, 2003, 301, 1519-1522; and commonly-assigned PCT Publication WO 05/012172.

Carbon nanotube chemistry has been described using a pyramidization angle formalism [S. Niyogi et al., *Acc. of Chem. Res.*, 2002, 35, 1105-1113]. Here, chemical reactivity and kinetic selectivity are related to the extent of s character due to the curvature-induced strain of the $sp^2$-hybridized graphene sheet. Because strain energy per carbon is inversely related to nanotube diameter, this model predicts smaller diameter nanotubes to be the most reactive, with the enthalpy of reaction decreasing as the curvature becomes infinite. While this behavior is most commonly the case, the role of the electronic structure of the nanotubes in determining their reactivity is increasingly important—especially when desiring selectivity among a population of similar-diameter CNTs (such as is often the case with SWNT product). Furthermore, because such structure is highly sensitive to chiral wrapping, chemical doping, charged adsorbates, as well as nanotube diameter, there exists a considerable diversity among these various pathways in addition to a simple diameter dependence, and with implications for separating CNTs by type.

Other methods with which CNTs can be separated by type have been reported. Such techniques include dielectrophoresis [Krupke et al., *Science*, 2003, 301, 244-347], selective precipitation [Chattophadhyay et al., *J. Am. Chem. Soc.*, 2003, 125, 3370-3375], ion-exchange chromatography [Zheng et al., *Nature Mater.*, 2003, 2, 338-342], and complexation/centrifugation [Chen et al., *Nano Lett.*, 2003, 3, 1245-1249].

Carbon nanotubes (CNTs), according to the present invention, include, but are not limited to, single-wall carbon nanotubes (SWNTs), multi-wall carbon nanotubes (MWNTs), double-wall carbon nanotubes, buckytubes, fullerene tubes, tubular fullerenes, graphite fibrils, and combinations thereof. Such carbon nanotubes can be of a variety and range of lengths, diameters, number of tube walls, chiralities (helicities), etc., and can be made by any known technique including, but not limited to, arc discharge [Ebbesen, *Annu. Rev. Mater. Sci.* 1994, 24; 235-264], laser oven [Thess et al., *Science* 1996, 273, 483-487], flame synthesis [Vander Wal et al., *Chem. Phys. Lett.* 2001, 349, 178-184], chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used, and combinations thereof. While not intending to be bound by theory, it is believed that the CNTs exhibiting photoluminescence in accordance with the present invention typically have diameters less than about 3 nm.

Depending on the embodiment, the CNTs can be subjected to one or more processing steps. In some embodiments, the CNTs have been purified. Exemplary purification techniques include, but are not limited to, those by Chiang et al. [Chiang et al., *J. Phys. Chem. B* 2001, 105, 1157-1161; Chiang et al., *J. Phys. Chem. B* 2001, 105, 8297-8301]. In some embodiments, the CNTs have been cut by a cutting process. See Liu et al., *Science* 1998, 280, 1253-1256; Gu et al., *Nano Lett.* 2002, 2(9), 1009-1013; Haddon et al., *Materials Research Society Bulletin*, 2004, 29, 252-259. The terms "carbon nanotube" and "nanotube" will be used interchangeably herein.

Depending on the embodiment, the CNTs used in the inks, markers, and methods of the present invention can be separated by length, diameter, type or species and/or chemically derivatized according to any of the above-described separation and/or chemical derivatization methods. "Separation," as defined herein, generally involves the concentration of CNTs of a particular type, dimension, or species. The extent of such separation, and the level at which it is carried out, can lead to essentially homogeneous populations of CNTs comprising a particular type, dimension, or species of CNT.

Generally, the fluorescent inks of the present invention ("nanotube inks") comprise a dispersion or suspension of CNTs in a liquid (i.e., solvent) medium. Such a dispersion may further comprise surfactant species and/or other traditional ink components. Fluorescent markers of the present invention are simply compositions CNTs with established photoluminescent properties that can be attached, incorporated into, and/or otherwise associated with an article for the purpose of identification and/or authentication. In some embodiments, the marker compositions may further comprise material other than CNTs, e.g., polymer.

Figure 2:
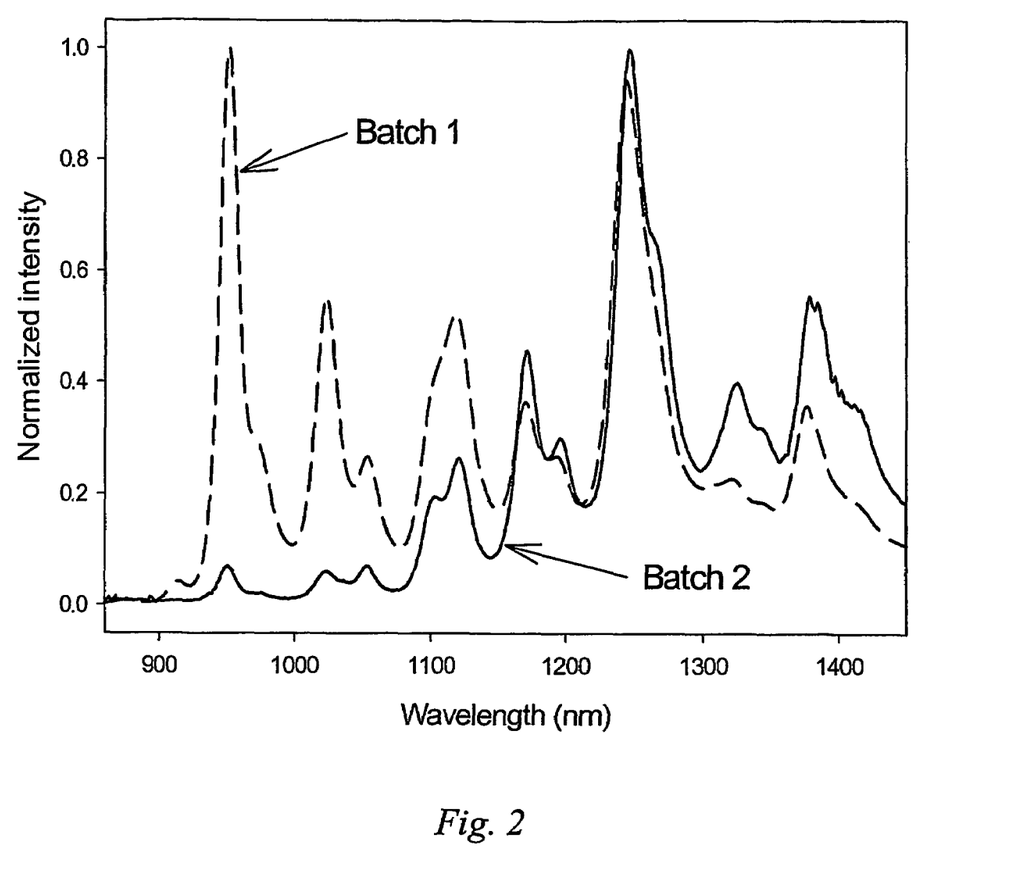
FIG. 2 depicts fluorescence spectra of two batches of SWNTs produced by the same reactor, but under slightly different synthesis conditions, that yield different fluorescence signatures when irradiated with 660 nm radiation from a diode laser source, wherein the relative quantities of particular SWNT semiconducting species within Batch 1 (dashed line) differ from those within Batch 2 (solid line)

In some embodiments, the CNTs within a nanotube ink or marker have been homogenized or separated by one or more of the above-described techniques. In some embodiments, separation and/or chemical derivatization techniques, such as those described above, are used to generate unique, designer mixtures of nanotubes of varying type, dimension and/or species. In some embodiments, it is merely enough to predetermine the fluorescence properties of the CNT mixture in a qualitative or quantitative manner. In some embodiments, the process parameters for the synthesis of the CNTs are altered so as to produce CNTs with a slightly different fluorescence signature. Indeed, there is greater flexibility for unique fluorescence signatures from mixtures than from homogenous populations (of CNTs). Referring to FIG. 2, it can be seen that SWNTs produced by the same reactor, but under slightly different synthesis conditions, yield different fluorescence signatures when irradiated with 660 nm radiation from a diode laser source, wherein the relative quantities of particular SWNT semiconducting species within Batch 1 (dashed line) differ from those within Batch 2 (solid line).

Suitable solvent media for nanotube inks and markers include, but are not limited to, water, alcohols, alkanes, N,N-dimethylformamide (DMF), dimethylsulfoxide (DMSO), o-dichlorobenzene, benzene, xylenes, toluene, mesitylene, tetrahydrofuran, chloroform, dichloromethane, FREONs (general class of halocarbons, primarily fluorinated hydrocarbons), supercritical fluids (SCFs, such as supercritical $CO_2$), and combinations thereof.

Surfactants, according to the present invention, can be any chemical agent which facilitates the dispersion of carbon nanotubes in water or other solvent media. Surfactants include ionic (cationic and anionic) surfactants and non-ionic surfactants. Suitable surfactants include, but are not limited to, sodium dodecyl sulfate (SDS), sodium dodecylbenzene sulfonate (SDBS), sodium octylbenzene sulfonate, TRITON X-100, TRITON X-405, dodecyltrimethylammonium bromide (DTAB), and combinations thereof. Such surfactants can aid in maintaining the stability of the dispersion and/or facilitating the wetting of a surface by the nanotube ink.

In some embodiments, the CNTs are dispersed in a superacid (e.g., oleum) or other intercalating media. See Ramesh et al., *J. Phys. Chem. B*, 2004, 108, 8794-8798.

In some embodiments, the CNTs, as markers, are incorporated into a polymer host as a composite or blend material, wherein the CNTs have a predetermined fluorescence signature. This blend can then be used to fabricate articles of manufacture, objects, or parts. In some embodiments, polymer fibers comprising such CNT fluorescence markers are fabricated. Such fibers can be used to make paper, currency, textiles, etc. Generally, but not always, the material or article into which the CNT fluorescence markers are being blended should be transparent to both the excitation and emission wavelengths used to detect and analyze the fluorescence signature.

Methods of using the fluorescent nanotube inks of the present invention can generally comprise the steps of 1) depositing a suspension of CNTs onto a surface, generally in the form of words, shapes, and/or patterns, and 2) removing the solvent. Provided that relatively small quantities of the CNTs are actually transferred to the surface, such words, shapes, and/or patterns can be said to be invisible and the nanotube ink referred to as an invisible ink. Such methods typically also can comprise the steps of 3) irradiating the ink with a visible light source, and 4) viewing the resulting fluorescence with a NIR optical viewer, such as an InGaAs camera or other such device.

As above, CNTs within such a suspension (dispersion) may previously have been subjected to separation and/or chemical derivatization techniques to generate homogenous and/or designer mixtures of CNTs. In some embodiments, where the CNTs have been subjected to chemical derivatization, a further step of thermal and/or chemical defunctionalization is used to cause the CNTs to revert back to their original underivatzed state [Bahr et al., *J. Mater. Chem.*, 2002, 12, 1952-1958]. Depending on the embodiment, and for use as an ink, it is generally sufficient to merely have a qualitative knowledge of the fluorescent properties of the CNTs within the mixture, such that no manipulation of the CNTs by type, dimension (length, diameter), or species is necessary for their use as inks.

The suspension of CNTs generally has the CNTs dispersed in a suitable solvent medium. As described above, there is considerable variety in the selection of such media. Often, a surfactant is added to provide for or enhance the suspension of CNTs.

In some embodiments of the present invention, the process of forming a mixture of surfactant-suspended carbon nanotubes comprises a homogenizing step. A homogenizing step, according to the present invention, can be any method which suitably homogenizes the mixture and renders at least some of the carbon nanotubes encapsulated in micellar-like assemblies.

In some embodiments of the present invention, the process of forming an mixture of surfactant-suspended carbon nanotubes further comprises ultrasonic assistance. Ultrasonic assistance can be provided by either an ultrasonic bath or an ultrasonic horn sonicator, typically operating at a power from between about 200 W to about 600 W. The duration of such ultrasonic assistance typically ranges from about 1 min to about 20 min.

In some embodiments of the present invention, the mixture of surfactant-suspended carbon nanotubes is centrifuged to separate the surfactant-suspended nanotube material from other material. In such embodiments, the other material gravitates to the bottom and the surfactant-suspended carbon nanotubes are decanted. In some embodiments of the present invention, the centrifugation is provided by an ultracentrifuge, and centrifugation is performed with an intensity which ranges generally from about 10,000 rpm to about 90,000 rpm, and for a duration which ranges generally from about 1 hour to about 6 hour.

In some embodiments, one or more additional materials are added to the suspension of CNTs (the ink). Such additional materials may include, dyes, binders, traditional fluorescent inks, magnetic materials, nanoparticles, or other materials used in the formulation of inks.

Surfaces or substrates, according to the present invention, include but are not limited to, paper, natural or synthetic fibers, metals, polymeric materials, ceramics, glasses, etc. In some embodiments, the surface is pretreated to facilitate adhesion of the ink. Such pretreatments can be of a chemical (e.g., etching) or physical (e.g., plasma) nature.

Depositing the suspension of CNTs, as nanotube ink, onto a surface can be by way of any number of standard printing techniques. Such techniques include, but are not limited to, inkjet printing, screen printing, lithographic techniques, brushing, spraying, flowing ink pens, stamping, and combinations thereof.

As an ink, such deposition can generally be in some patterned form such as words and/or shapes and symbols. In some embodiments, however, this nanotube ink is invisible to the naked eye.

Solvent removal generally involves an evaporative process. Such evaporative processes can be facilitated by heat, vacuum, and/or other processes.

In some embodiments, after solvent removal, an additional treatment is applied to the deposited ink. Such additional treatments generally serve to protect the integrity of the words, shapes or symbols printed on a surface. Such treatments may comprise a lamination, e.g., the deposition of a polymer or glass film over the deposited ink, wherein the deposited polymer of glass is transparent to both the excitation and emission wavelengths required to induce and detect fluorescence.

Irradiation of the deposited ink can be done with a variety of visible light sources. Such sources provide the excitation required for fluorescence and can be monochromatic or polychromatic in nature. In some embodiments, the excitation source is a laser. In some embodiments, the excitation source has a wavelength near or above 750 nm so as to be essentially invisible itself.

Viewing or detecting the fluorescent emission, which has a frequency in the near infrared region of the EM spectrum, is generally done with an near infrared viewer or camera, such as an InGaAs camera or imager. It is generally not necessary, in the case of such inks, to resolve the spectral information, but this can be done with spectral imaging techniques when desired.

Methods of using CNTs as fluorescent identifiers (e.g., spectral bar codes) rely on a knowledge of their photoluminescence properties and on techniques of incorporating and/or attaching such species to articles being marked or tagged. Generally, such methods comprise the steps of: 1) providing a plurality of carbon nanotubes with unique, predetermined photoluminescence characteristics; and 2) incorporating the carbon nanotubes into articles as optical identifiers to form optically tagged articles. Methods of using CNTs as fluorescent identifiers may further comprise the steps of: 3) irradiating the optically tagged articles with EM radiation; and 4) detecting photoluminescence from the carbon nanotubes for the purpose of identifying the optically tagged article.

The use of CNTs compositions as markers generally requires a thorough understanding of their fluorescence properties. In some embodiments, the CNTs have been subjected to separation and/or chemical derivatization techniques to generate homogenous and/or designer mixtures of CNTs. In some embodiments, where the CNTs have been subjected to chemical derivatization, a further step of thermal and/or chemical defunctionalization is used to cause the CNTs to revert back to their original, underivatized state. In some embodiments, CNTs are synthesized as unique mixtures with unique fluorescent properties. Regardless of how the CNTs have been synthesized and/or processed, the fluorescence signature (i.e., spectra) for such CNTs is carefully evaluated (i.e., predetermined) prior to marking or tagging articles or objects with the CNT fluorescent markers.

In some embodiments, the CNT markers can be suspended in a solvent medium and applied as an ink (as above). Such inks could contain multiple levels of information, wherein the shapes and/or words contain one level of information and additional levels of spectral information can be contained within the CNT marker compositions within the inks.

In some embodiments, the markers are incorporated into a host material, wherein the host material is generally transparent to the excitation and emission wavelengths with which the CNTs fluoresce. Typically, such host materials are polymeric in nature, but they can also be ceramic or glass. The CNT markers can be attached to an article either directly or in a host material. In some embodiments, the CNTs markers are incorporated into a host material that makes up an article or manufacture. For example, CNT markers could be blended into synthetic fibers which are then used to make articles of clothing. In some embodiments, the host material is liquid or fluid.

Irradiating the CNT fluorescent markers can be done with a variety of visible light sources. Such sources provide the excitation required for fluorescence and can be monochromatic or polychromatic in nature. In some embodiments, the excitation source is a laser. Suitable lasers sources include, but are not limited to, solid state diode lasers, HeNe lasers, Ar lasers, Kr lasers, and combinations thereof. In some embodiments, greater differentiation between sets of CNTs is afforded by the use of two or more discrete excitation wavelengths.

Detection of the emission can be qualitative in nature using spectral filters and such. More typically, however, detection is such that the spectral signature of the CNT markers is resolved, thus providing a high level of identification. Such spectral resolution is typically provided via spectroscopic gratings and NIR detectors. Suitable NIR detectors include, but are not limited to, photodiodes, photomultipliers, one- or two-dimensional photodiode arrays, or CCD or CMOS cameras based on semiconductors such as Si, Ge, or InGaAs.

Applications for the nanotube inks and markers of the present invention include, but are not limited to, authentication of currency, security documents, passports, drivers licenses, pharmaceuticals, clothing and other consumer goods, books, art, and combinations thereof. Such inks and markers can be used in quality or process control to identify batches. Such inks or markers could also be used in leak detection or other similar applications. Additionally such inks and/or markers could be used in combination with other methods of authentication and identification such as magnetic devices, strips or labels.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

This Example serves to illustrate a manner in which nanotube inks can be used according to some embodiments of the present invention.

SWNTs (HiPco, Rice University) were dispersed in an aqueous solution of SDS surfactant by an accepted process of high-shear mixing, ultrasonic agitation, and ultracentrifugation to create a nanotube ink.

The nanotube ink suspension was used to fill the reservoir of a flowing ink drafting pen, which was then used with a drafting template to write the characters "SWNT" onto a piece of office paper manufactured with a mild gloss coating. The ink was then allowed to dry such that the resulting characters were approximately 5 mm in height and with a mass per character of approximately 10 nanograms. Such a small amount of SWNTs renders the ink invisible to the naked eye.

Figure 3:
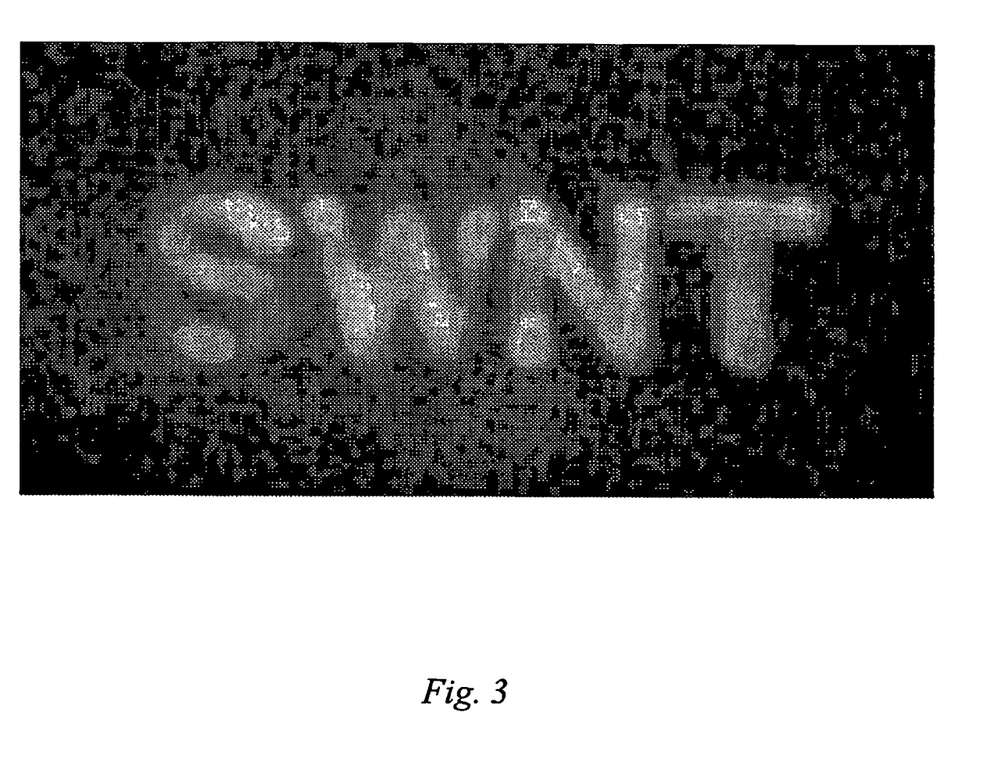
FIG. 3 illustrates a near-infrared photograph of an embodiment wherein single-wall carbon nanotubes are applied to a surface (as ink) and illuminated with light in the visible region to effect photoluminescence in the near-infrared.

Upon irradiation with monochromatic light of 671 nm wavelength, the letters were seen to fluoresce, emitting radiation in the NIR. This emission was detected with a camera with a detection range of 1125-1700 nm. While invisible to the naked eye, FIG. 3 is an image generated by this NIR camera with an exposure of 6 video frames.

EXAMPLE 2

This Example serves to illustrate how CNT fluorescent markers can be integrated into host materials like polymers.

SWNTs (HiPco, Rice University) were blended into a poly (methylmethacrylate) (PMMA) matrix by ultrasonic dispersion of SWNTs into a xylene solution of PMMA. Evaporation of the xylene gave an optically clear solid containing fluorescent SWNTs.

Figure 4:
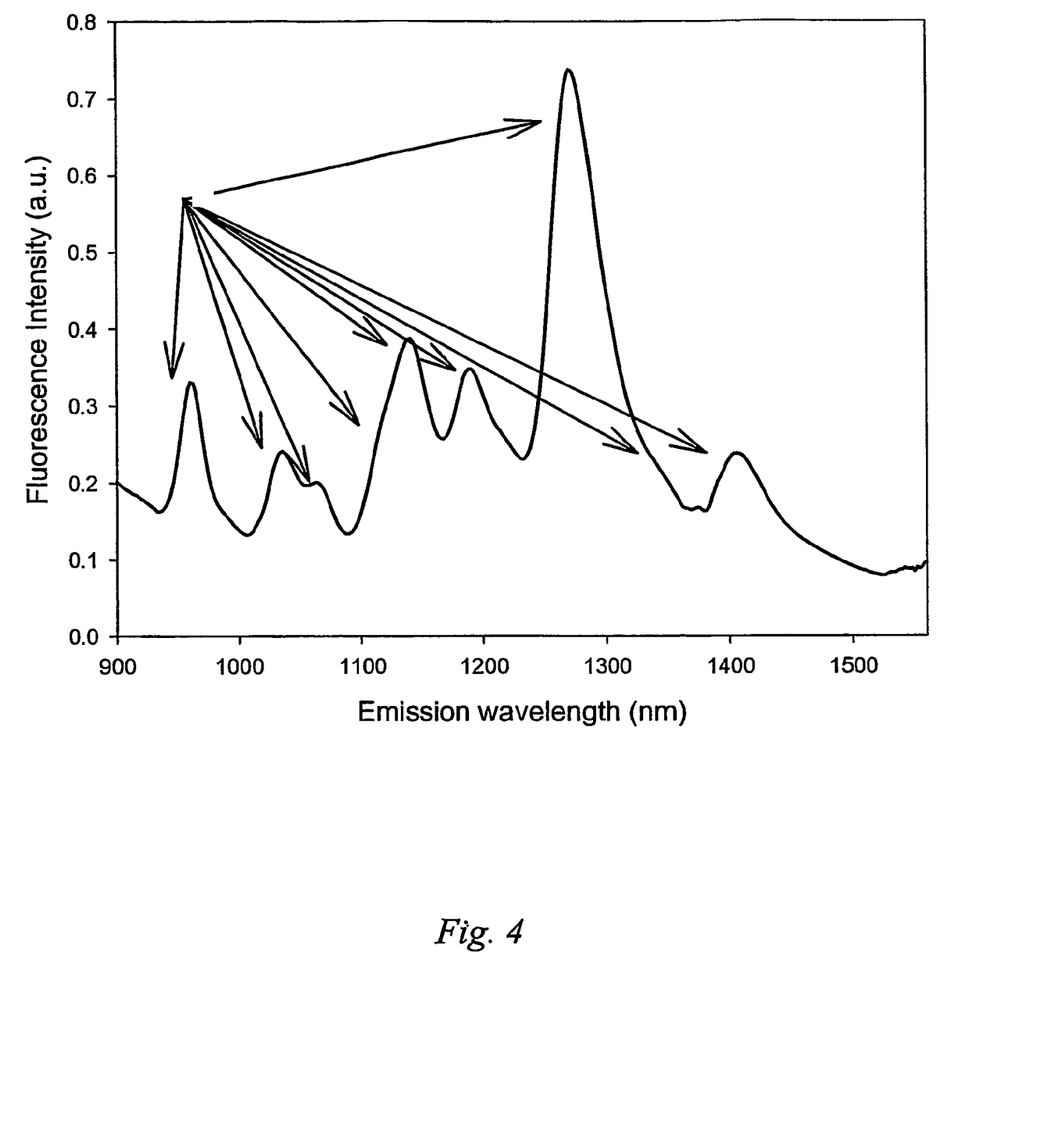
FIG. 4 is a fluorescence spectrum of SWNT fluorescence markers that have been integrated into a PMMA host, wherein excitation is at 669 nm from a diode laser.

FIG. 4 is a fluorescence spectrum of these SWNT markers which have been integrated into the PMMA host, wherein excitation is at 669 nm from a diode laser. Each peak indicated by an arrow corresponds to fluorescence from a different SWNT species within the sample.

EXAMPLE 3

This Example serves to illustrate excitation selectively within a CNT sample comprising a variety of CNT species.

In the case of SWNTs, due to excitation selectivity, only a subset of SWNT types will be detectable with some "standard" excitation wavelength, such as 660 to 670 nm (the region where some common semiconductor diode lasers emit). Many nanotube types that might be present in the sample may be hidden or exhibit an emission intensity which is too low to be detected, especially where such peaks lie close to intense peaks activated with such "standard" excitation wavelengths. The application of additional excitation wavelengths can possibly reveal these typically "hidden" peaks (and the semiconducting SWNT species that produce them).

Figure 5:
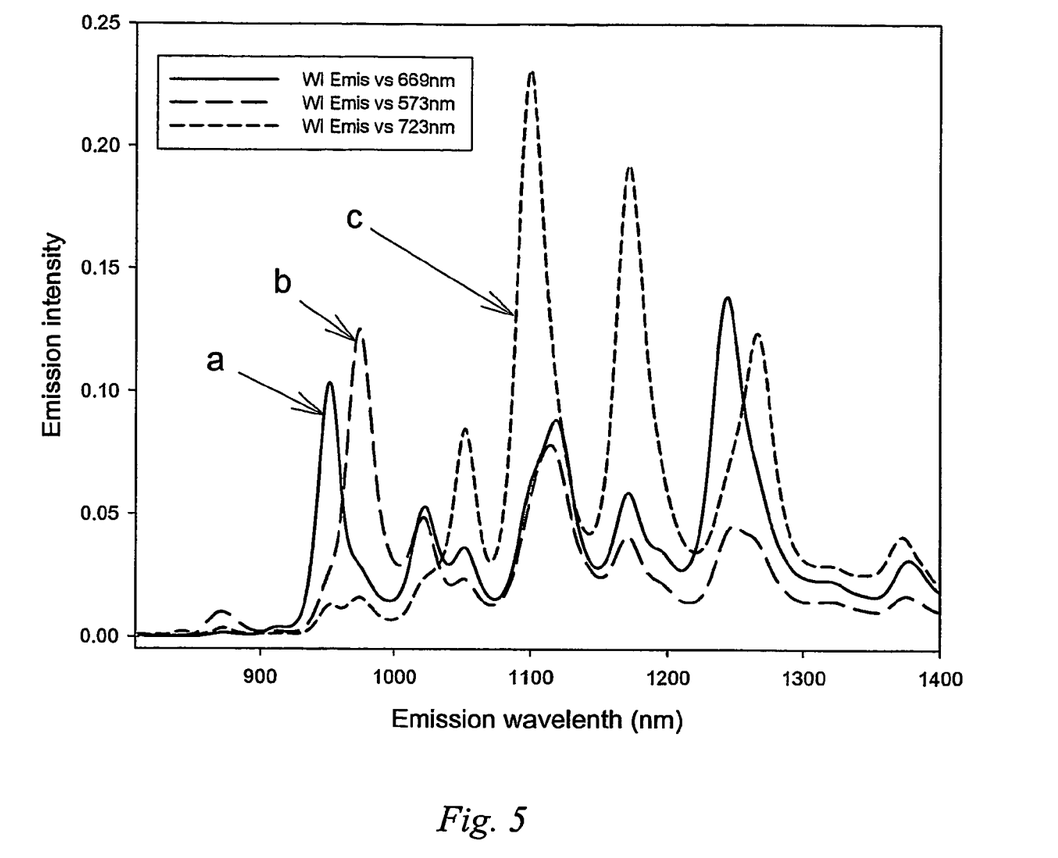
FIG. 5 depicts the fluorescence spectra of a single sample of SWNT (HiPco, Rice University), taken with three different excitation wavelengths, wherein excitation wavelengths are as follows: trace a, 669 nm; trace b, 573 nm; and trace c, 723 nm.

FIG. 5 depicts the fluorescence spectra of the same SWNT sample (HiPco, Rice University), taken with three different excitation wavelengths, wherein excitation wavelengths are as follows: trace a, 669 nm; trace b, 573 nm; and trace c, 723 nm.

It can be seen from FIG. 5 that the relative intensities of the peaks change when the excitation frequency is changed, revealing a selectivity to the excitation. Such excitation selectivity can be exploited in anti-counterfeiting applications.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A fluorescent ink, comprising:
a solvent;
a surfactant; and
carbon nanotubes suspended in the solvent;
   wherein the carbon nanotubes are dispersed in the solvent;
   wherein the carbon nanotubes are fluorescent and have diameters of less than about 3 nm; and
   wherein the carbon nanotubes have a visible excitation and an emission following the visible excitation; and
wherein the fluorescent ink is suitable for deposition on a surface.

2. The fluorescent ink of claim 1, wherein the carbon nanotubes are selected from the group consisting of single-wall carbon nanotubes, multi-wall carbon nanotubes, double-wall carbon nanotubes, and combinations thereof.

3. The fluorescent ink of claim 1, wherein the carbon nanotubes comprise single-wall carbon nanotubes.

4. The fluorescent ink of claim 3, wherein the carbon nanotubes comprise an essentially homogenous population of carbon nanotubes;
   wherein the essentially homogenous population comprises a property selected from the group consisting of type, dimension, or species.

5. The fluorescent ink of claim 3, wherein the carbon nanotubes comprise separated carbon nanotubes;
   wherein the separated carbon nanotubes have fluorescence properties tuned within a range of excitation and emission wavelengths.

6. The fluorescent ink of claim 1, wherein the solvent is selected from the group consisting of water, organic solvents, supercritical fluids, and combinations thereof.

7. A fluorescent ink, comprising:
a solvent;
   wherein the solvent is selected from the group consisting of water, organic solvents, supercritical fluids and combinations thereof;
a surfactant; and
single-wall carbon nanotubes suspended in the solvent;
   wherein the single-wall carbon nanotubes are dispersed in the solvent;
   wherein the single-wall carbon nanotubes are fluorescent and have diameters of less than about 3 nm; and
   wherein the single-wall carbon nanotubes have a visible excitation and an emission following the visible excitation; and
wherein the fluorescent ink is suitable for deposition on a surface.

8. The fluorescent ink of claim 1, further comprising an additive selected from the group consisting of traditional fluorescent inks, dyes, binders, nanoparticles, magnetic materials, and combinations thereof.

9. The fluorescent ink of claim 3, wherein the emission comprises a near-infrared emission.

10. The fluorescent ink of claim 1, wherein the fluorescent ink is suitable for deposition on the surface in a patterned form.

11. A fluorescent ink, comprising:
a solvent; and
carbon nanotubes suspended in the solvent;
   wherein the carbon nanotubes are homogenized by electronic type;
   wherein the carbon nanotubes are dispersed in the solvent;
   wherein the carbon nanotubes are fluorescent and have diameters of less than about 3 nm; and
   wherein the carbon nanotubes have a visible excitation and an emission following the visible excitation; and
wherein the fluorescent ink is suitable for deposition on a surface.

12. The fluorescent ink of claim 1, further comprising a polymer.

13. The fluorescent ink of claim 1, wherein the carbon nanotubes are chemically derivatized.

14. A fluorescent ink, comprising:
- a solvent; and
- single-wall carbon nanotubes suspended in the solvent;
  - wherein the single-wall carbon nanotubes are dispersed in the solvent;
  - wherein the single-wall carbon nanotubes are fluorescent and have diameters of less than about 3 nm; and
  - wherein the single-wall carbon nanotubes have a visible excitation and an emission following the visible excitation; and
- wherein the fluorescent ink is suitable for deposition on a surface; and
- wherein the fluorescent ink comprises an invisible ink.

* * * * *